(12) United States Patent
Miura et al.

(10) Patent No.: US 7,169,071 B2
(45) Date of Patent: Jan. 30, 2007

(54) CONTINUOUSLY VARIABLE TRANSMISSION BELT AND METHOD OF PRODUCING METAL ELEMENT OF THE BELT

(75) Inventors: Yoshitaka Miura, Yokohama (JP); Kazuhiro Mizumiya, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 47 days.

(21) Appl. No.: 10/351,423

(22) Filed: Jan. 27, 2003

(65) Prior Publication Data

US 2003/0162616 A1    Aug. 28, 2003

(30) Foreign Application Priority Data

Feb. 26, 2002    (JP)    ............................. 2002-049849

(51) Int. Cl.
*F16G 5/16*    (2006.01)
(52) U.S. Cl. .................................................. 474/242
(58) Field of Classification Search ................ 474/202, 474/204, 237, 238, 242, 244
See application file for complete search history.

(56) References Cited

U.S. PATENT DOCUMENTS 4,281,483 A * 8/1981 Horowitz et al. ............. 451/59
4,610,648 A * 9/1986 Miranti, Jr. ................. 474/242
5,346,440 A * 9/1994 Smeets ....................... 474/242

FOREIGN PATENT DOCUMENTS

| EP | 0 562 654 A1 | 9/1993 |
|---|---|---|
| JP | 59-79653 U | 5/1984 |
| JP | 2-72837 U | 6/1990 |
| JP | 1 067 311 A1 | 1/2001 |
| JP | 2001-21007 A | 1/2001 |
| JP | 2002-54691 A | 2/2002 |

* cited by examiner

*Primary Examiner*—Vicky A. Johnson
(74) *Attorney, Agent, or Firm*—Foley & Lardner LLP (57) ABSTRACT

A continuously variable transmission belt, including a metal ring assembly including a plurality of metal rings, and a plurality of metal elements which are retained by the metal ring assembly and each has a saddle surface contacted with an inner circumferential surface of the metal ring assembly. The saddle surface includes opposed end peripheries spaced from each other in a traveling direction of the belt and a curved portion located at each of the opposed end peripheries. The curved portion has a range length extending in the traveling direction of the belt and a radius of curvature larger than the range length. The metal element is produced by a method including subjecting a metal sheet to presswork to form a workpiece, subjecting the workpiece to heat treatment and deburring and then to preliminary beveling and subsequent beveling.

4 Claims, 6 Drawing Sheets

FRONT ◄──── ► REAR

FIG.1

FRONT ← → REAR

CONTINUOUSLY VARIABLE TRANSMISSION BELT AND METHOD OF PRODUCING METAL ELEMENT OF THE BELT

BACKGROUND OF THE INVENTION

The present invention relates to a belt for a continuously variable transmission (CVT) which is constituted of a metal ring assembly and a plurality of metal elements, and a method of producing each of the metal elements of the CVT belt.

Figure 2A:
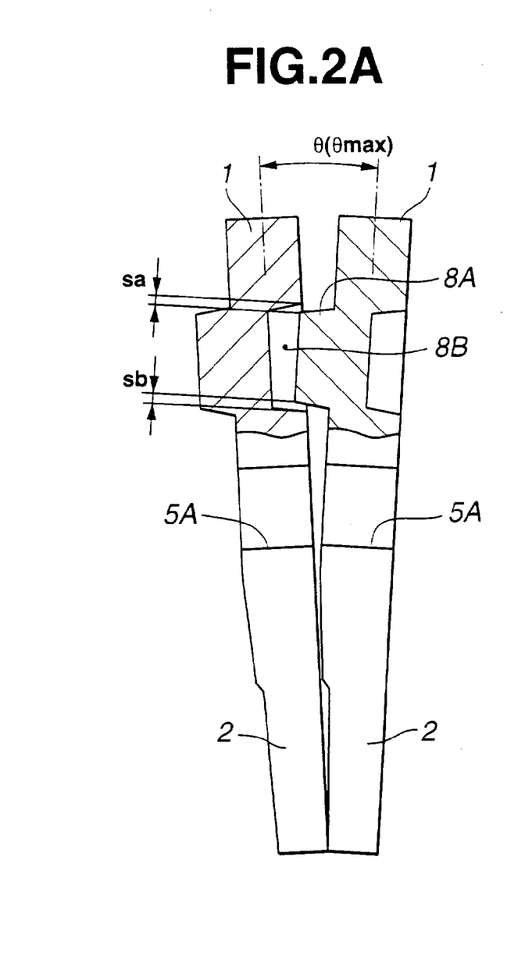
FIG. 2A is an explanatory diagram illustrating, partly in section, a neutral state of two adjacent metal elements of a CVT belt.
Figure 2B:
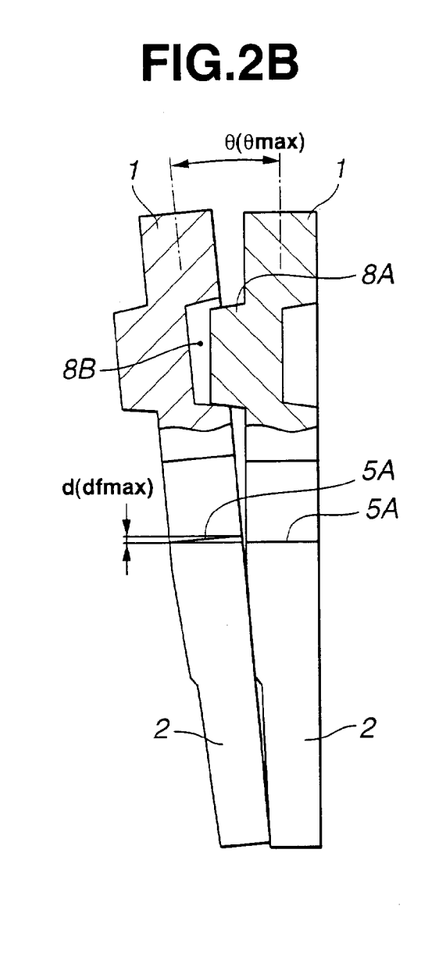
FIG. 2B is a diagram similar to FIG. 2A, but illustrating a forward inclined state of the adjacent metal elements.
Figure 2C:
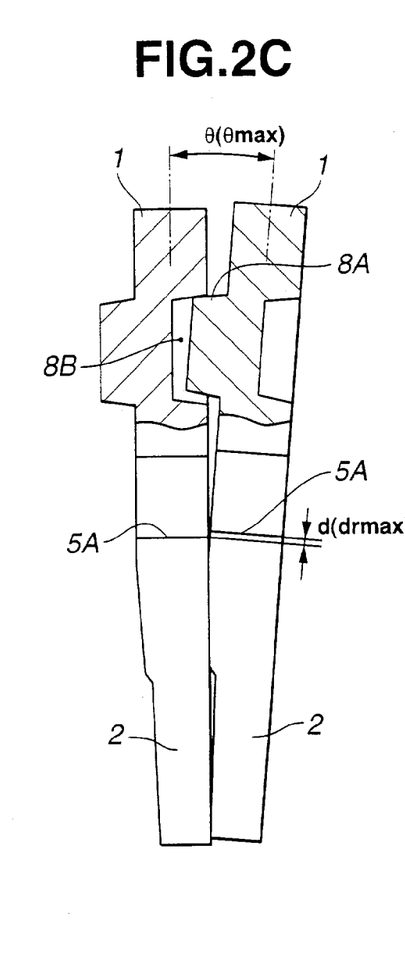
FIG. 2C is a diagram similar to FIG. 2A, but illustrating a rearward inclined state of the adjacent metal elements.
Figure 6:
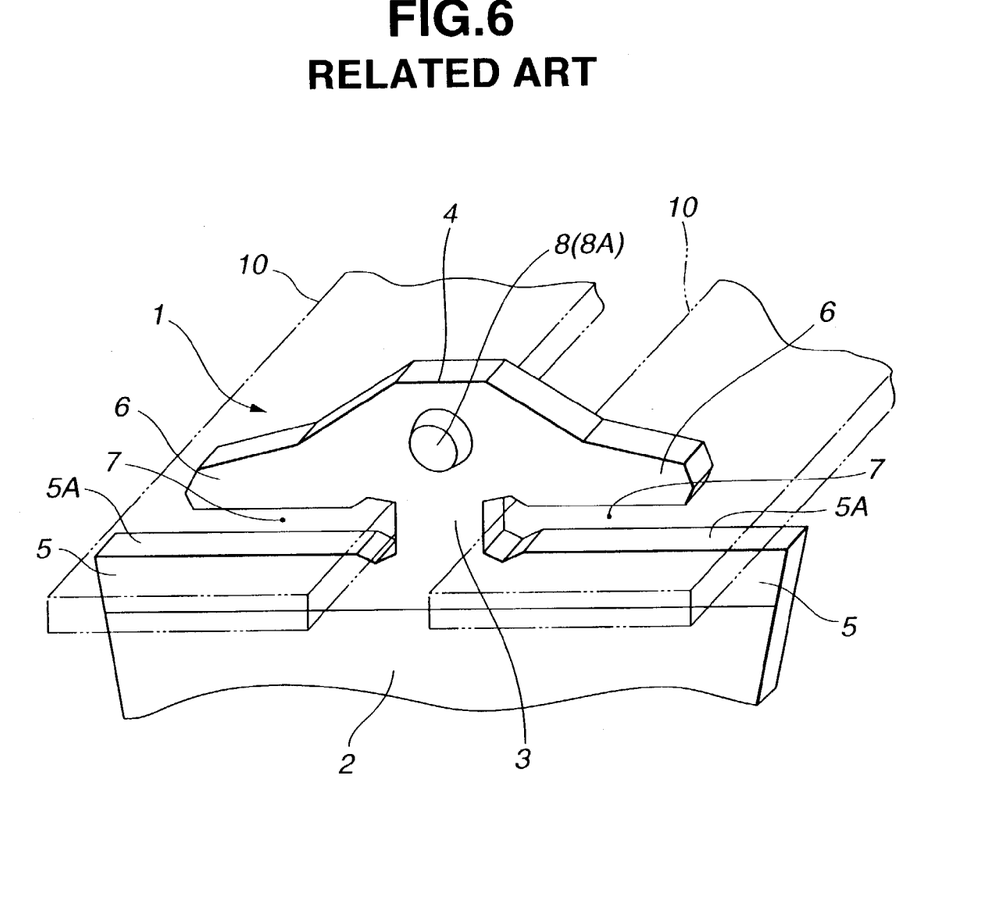
FIG. 6 is a perspective view of a CVT belt of a related art.

FIG. 6 illustrates a part of an endless CVT belt of a related art, which includes metal element 1 and metal ring assembly 10 supporting metal element 1 thereon. Metal ring assembly 10 is indicated by a phantom line, which is formed by a plurality of metal rings laminated one on another. Each of the metal rings is made of a thin metal sheet. Metal element 1 is formed by subjecting a workpiece to presswork and then to deburring and heat treatment. The workpiece is made of a metal sheet. Metal element 1 includes body 2, head 4 with ears 6, and neck 3 connecting head 4 to body 2. Body 2 includes saddle portions 5 which are disposed on an upper portion thereof and spaced from each other in a lateral direction perpendicular to a circumferential direction of the CVT belt. Body 2 includes a lower portion having a thickness which gradually decreases in a downward direction such that metal element 1 is inclinable forward or rearward in a traveling direction of the CVT. Neck 3 is disposed between saddle portions 5. Metal element 1 includes two slots 7 respectively disposed between saddle portions 5 and ears 6. Each of slots 7 is partly defined by saddle surface 5A of saddle portion 5. Metal ring assembly 10 is engaged in each of slots 7. Engaging projection 8 is formed on a central portion of head 4 as shown in FIG. 6. Engaging projection 8 defines projecting portion 8A on one side face of head 4 and recessed portion 8B on an opposite side face thereof as shown in FIGS. 2A–2C. A plurality of metal elements 1 are arranged in array in the circumferential direction of the CVT belt to form an annular shape as a whole. In the arrangement, projecting portion 8A of engaging projection 8 of metal element 1 is engaged with recessed portion 8B of engaging projection 8 of adjacent metal element 1. Neck 3 is disposed in a space between metal ring assemblies 10. The thus-constructed CVT belt is wound on a pair of pulleys of the CVT.

When the CVT belt passes by the pulleys during operation of the CVT, the adjacent metal elements are inclined forward or rearward in the traveling direction of the CVT belt. Due to the inclination of the adjacent metal elements, there occurs difference in height between the saddle surfaces. This will cause the inner circumferential surface of the metal ring assembly to be pressed onto front or rear ridges where the adjacent saddle surfaces encounter front and rear surface in the traveling direction of the CVT belt. Therefore, stress concentration will occur the mutual contact portion between the ridges of the respective saddle surfaces and the inner circumferential surface of the metal ring assembly.

Japanese Patent Application First Publication No. 2001-21007 (corresponding to European Patent Application First Publication No. 1067311 A1) discloses a metal element of a CVT belt which includes a saddle surface having curved portions on the opposed peripheries in a traveling direction of the CVT belt. The curved portions are formed by beveling such as barrel polishing. With the provision of the curved portions on the opposed peripheries of the saddle surface, the related art aims at reducing the stress concentration which occurs at the inner circumferential surface of the metal ring assembly when the adjacent metal elements comes into contact with the opposed peripheries of the saddle surface of each of the metal elements at an inclined state thereof upon passing by the pulleys. Owing to the reduction of the stress concentration, the related art aims at preventing deterioration of a life of the metal ring assembly.

SUMMARY OF THE INVENTION

In order to reduce the stress concentration which is caused at the mutually contacting portion between the inner circumferential surface of the metal ring assembly and the opposed peripheries of the saddle surface of the metal element, it will be advantageous to form a bevelled or chamfered curved portion of the saddle surface which has an increased radius of curvature. However, if merely the radius of curvature of the curved portion is increased, there arise defects such as deteriorated machinability, increased amount of material of the workpiece which is removed by beveling and as an increased beveling time required for forming the curved portion of the saddle surface. Although the metal element per se is a relatively small part, several hundreds of metal elements are used in a CVT belt, and therefore, the total amount of material removed by beveling the several hundreds of metal elements becomes significantly large. This cannot be ignored in production of the metal element. Further, even if the curved portion is formed on each of the opposed peripheries of the saddle surface, there will occur stress concentration at the mutually contacting portion between the metal ring assembly and a ridge at which the curved portion of the saddle surface encounters a front or rear surface of the saddle portion.

An object of the present invention is to provide a continuously variable transmission (CVT) belt including a metal ring assembly and metal elements, in which even when the adjacent metal elements are inclined forward or rearward in a traveling direction of the CVT belt to generate difference in height between saddle surfaces of adjacent saddle portions thereof, the mutual contact between the metal ring assembly and front and rear ridges of the respective saddle portions can be prevented and occurrence of stress concentration at the ridge can be suppressed. A further object of the present invention is to provide the CVT belt including a metal ring assembly and metal elements, in which an amount of workpiece material to be removed by beveling upon producing the metal elements can be reduced. Another object of the present invention is to provide a method of producing the metal element of the CVT belt.

In one aspect of the present invention, there is provided a continuously variable transmission belt, the belt comprising:
 a metal ring assembly including a plurality of metal rings;
 a plurality of metal elements retained by the metal ring assembly; and
 each of the metal elements having a saddle surface which is contacted with an inner circumferential surface of the metal ring assembly, the saddle surface including opposed end peripheries spaced from each other in a traveling direction of the belt and a curved portion located at each of the opposed end peripheries, the curved portion having a range length extending in the traveling direction of the belt and a radius of curvature larger than the range length.

In a further aspect of the present invention, there is provided a method of producing a metal element in a continuously variable transmission belt including a metal ring assembly retaining the metal element, the metal element having a saddle surface contacted with an inner circumferential surface of the metal ring assembly, the saddle surface including opposed end peripheries spaced from each other in a traveling direction of the belt and a curved portion located at each of the opposed end peripheries, the method comprising:

subjecting a metal sheet to presswork to form a workpiece;

subjecting the workpiece to heat treatment and deburring;

subjecting the workpiece to preliminary beveling to form flat surfaces at opposed end peripheries of the workpiece which are spaced from each other in the traveling direction of the belt; and subjecting each of the flat surfaces preliminarily beveled to subsequent beveling to provide the curved portions at the opposed end peripheries of the saddle surface of the metal element such that each of the curved portions has a range length extending in the traveling direction of the belt and a radius of curvature larger than the range length.

DETAILED DESCRIPTION OF THE EMBODIMENT

Figure 1:
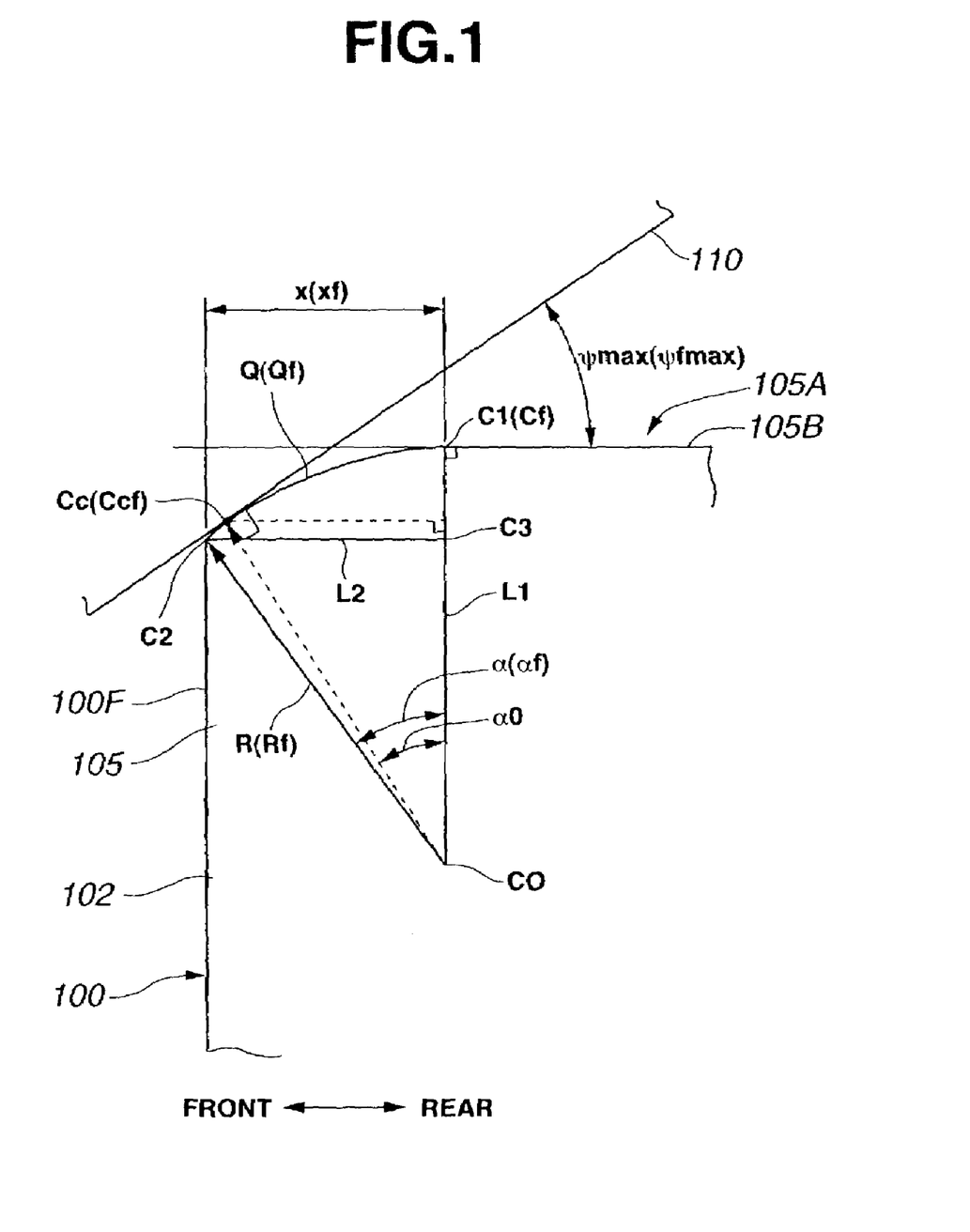
FIG. 1 is a fragmentary enlarged side view of a CVT belt according to an embodiment of the present invention, showing a metal element and a metal ring assembly.

Referring to the drawings, there is explained an endless CVT belt of the present invention. The CVT belt includes a metal ring assembly and a plurality of metal elements retained by the metal ring assembly, as explained in the CVT belt shown in FIG. 6. FIG. 1 is a vertical cross section of a part of the CVT belt of the invention. In FIG. 1, metal element 100 is kept in a rearward inclined state in a traveling direction of the CVT belt such that metal element 100 is contacted at its front end periphery with metal ring assembly 110. Metal ring assembly 100 is formed by a plurality of metal rings which are made of thin metal sheets and laminated one on another. Metal element 100 is formed by subjecting a workpiece to presswork and then to heat treatment and deburring by barrel finishing or other polishing methods. The workpiece is made of a metal sheet having a thickness of about 1.8 mm. Metal element 100 has body 102 including saddle portions 105 spaced from each other in a lateral direction perpendicular to the traveling direction of the CVT belt. Similar to metal element 1 shown in FIG. 6, metal element 100 includes a head with ears and an engaging projection, a neck connecting the head to body 102, and slots each engaged with metal ring assembly 110. FIG. 1 shows one of saddle portions 105. Saddle portion 105 has saddle surface 105A on which metal ring assembly 110 is disposed. Saddle surface 105A defines a part of the slot and contacts an inner circumferential surface of metal ring assembly 110. Saddle surface 105A includes flat major portion 105B and curved portion Q continuously connected with major portion 105B. Curved portion Q is located at each of the opposed peripheries of saddle surface 105A which are spaced from each other in the traveling direction of the CVT belt. Curved portion Q has range length x extending in the fore-and-aft direction of metal element 100 and radius of curvature R larger than range length x. Specifically, range length x of curved portion Q means a distance between front surface 100F of metal element 100 and an imaginary plane containing line L1 which joins center of curvature C0 of curved portion Q and boundary point C1 between curved portion Q and major portion 105B.

Preferably, under condition that adjacent two metal elements 100 of the CVT belt are inclined forward or rearward in the traveling direction of the CVT belt so as to have a maximum pitch angle between center lines thereof and that a maximum height difference between saddle surfaces 105A of adjacent metal elements 100 is generated, a relationship between maximum angle $\psi$max between major portion 105B of saddle surface 105A and the inner circumferential surface of metal ring assembly 110, range length x of curved portion Q, and radius of curvature R of curved portion Q is represented by the following expression:

$$\sin \psi\mathrm{max} < x/R < 1 \qquad (1)$$

If the expression (1) is satisfied, optimal configuration of curved portion Q can be obtained. Meanwhile, in FIG. 1, maximum angle $\psi$max indicated is exaggerated so as to be larger than the actual one for the purpose of easy understanding.

Specifically, curved portion Q and major portion 105B cooperate to form continuously extending saddle surface 105A. Center of curvature C0 of curved portion Q is located on line L1 which extends perpendicular to saddle surface 105A and passes through boundary point C1 between curved portion Q and major portion 105B. Namely, line L1 is a normal to curved portion Q at point C1. C2 indicates a front boundary point between curved portion Q and front surface 100F of metal element 100. Front boundary point C2 lies on a ridge at which curved portion Q and front surface 100F encounter with each other. The ridge extends in a lateral direction of metal element 100 which is perpendicular to the circumferential direction of the CVT belt and opposed side surfaces of metal element 100. Line L2 passes through front boundary point C2 and perpendicularly intersects line L1 at point C3. There is a right-angled triangle formed by three lines indicated by L1, L2 and R, which join center of curvature C0, boundary point C2 and intersection point C3. Angle $\alpha$ between lines L1 and R is represented by the following expressions:

$$\sin \alpha = x/R \qquad (2)$$

$$\alpha = \sin^{-1}(x/R) \qquad (3)$$

Here, a distance between points C2 and C3 on line L2 is equivalent to range length x of curved portion Q. Angle α between lines L1 and R is equivalent to an angle at the center subtended by an arc of curved portion Q. Angle α is referred to as range angle α hereinafter.

If front boundary point C2 is located at point Cc of contact between curved portion Q and an inner circumferential surface of metal ring assembly 110 under condition that maximum angle ψmax between major portion 105B of saddle surface 105A and the inner circumferential surface of metal ring assembly 110 is made, the right-angled triangle is indicated by phantom line in FIG. 1. In this case, range angle α0 of curved portion Q is equivalent to maximum angle ψmax. Accordingly, the inner circumferential surface of metal ring assembly 110 is contacted with saddle surface 105A at front boundary point C2, namely, the ridge at which front surface 100F encounters curved portion Q. There occurs stress concentration at the mutually contacting portion between the inner circumferential surface of metal ring assembly 110 and the ridge between front surface 100F and curved portion Q.

In metal element 100 of the invention, $\psi max < \sin^{-1}(x/R)$ is transformed from $\sin \psi max < x/R$ in the expression (1). The following expression is derived from the expression (3) and the transformed expression.

$$\psi max < \alpha \quad (4)$$

Therefore, if range angle α of curved portion Q is larger than maximum angle ψmax, the inner circumferential surface of metal ring assembly 110 can be in contact with saddle surface 105A in the range of curved portion Q and be prevented from coming into contact with the ridge between front surface 100F and curved portion Q. Even when the angle between major portion 105B and the inner circumferential surface of metal ring assembly 110 is maximum angle ψmax, a clearance between the ridge and the inner circumferential surface of metal ring assembly 110 can be ensured. Further, if $x/R < 1$, wherein $x < R$, in the expression (1) is satisfied, radius of curvature R of curved portion Q will be a required minimum value.

Although the above explanation is given with respect to curved portion Q formed on the front end periphery of saddle surface 105A of metal element 100, the explanation can also be applied to curved portion Q similarly formed on the rear end periphery thereof.

The metal element of the present invention is produced by the following method. First, a workpiece having substantially the same shape as that of metal element 1 shown in FIG. 6 is formed by presswork, namely, by stamping a metal sheet. The workpiece is subjected to heat treatment and deburring. Upon the deburring operation, barrel finishing or other polishing can be used. Subsequently, the workpiece is subjected to preliminary beveling to form a flat surface on each of front and rear end peripheries of the saddle surface. Preferably, the flat surface has a gradient not less than maximum angle ψmax between saddle surface 105A and the inner circumferential surface of metal ring assembly 100 as shown in FIG. 1. The flat surface is then subjected to beveling, for instance, barrel finishing, to form curved portion Q continuously connected with major surface 105B of saddle surface 105A as shown in FIG. 1.

Figure 3A:
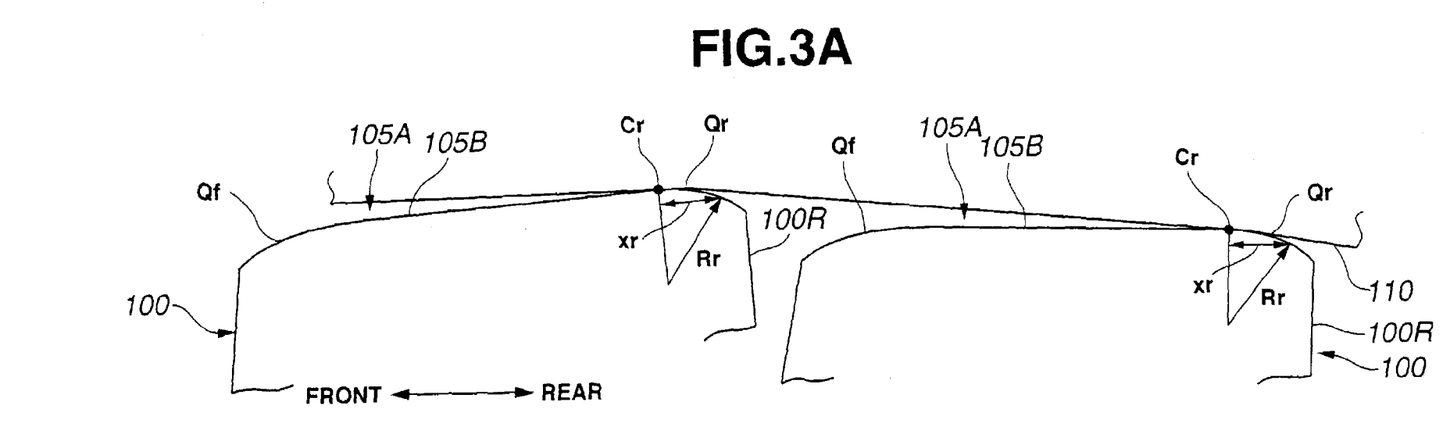
FIGS. 3A and 3B are explanatory diagrams illustrating elements for determination of a curved portion of the saddle surface which is located on a rear end periphery of the saddle surface, at the forward inclined state of adjacent metal elements according to the embodiment of the present invention.
Figure 4A:
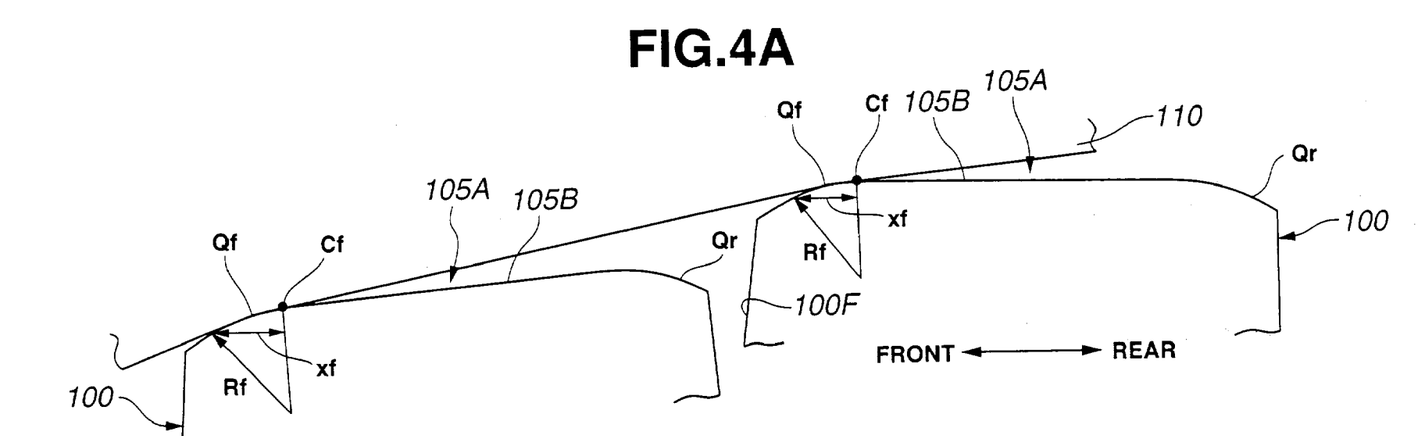
FIGS. 4A and 4B are explanatory diagrams illustrating elements for determination of a curved portion of the saddle surface which is located on a front end periphery of the saddle surface, at the rearward inclined state of adjacent metal elements according to the embodiment of the present invention.
Figure 5:
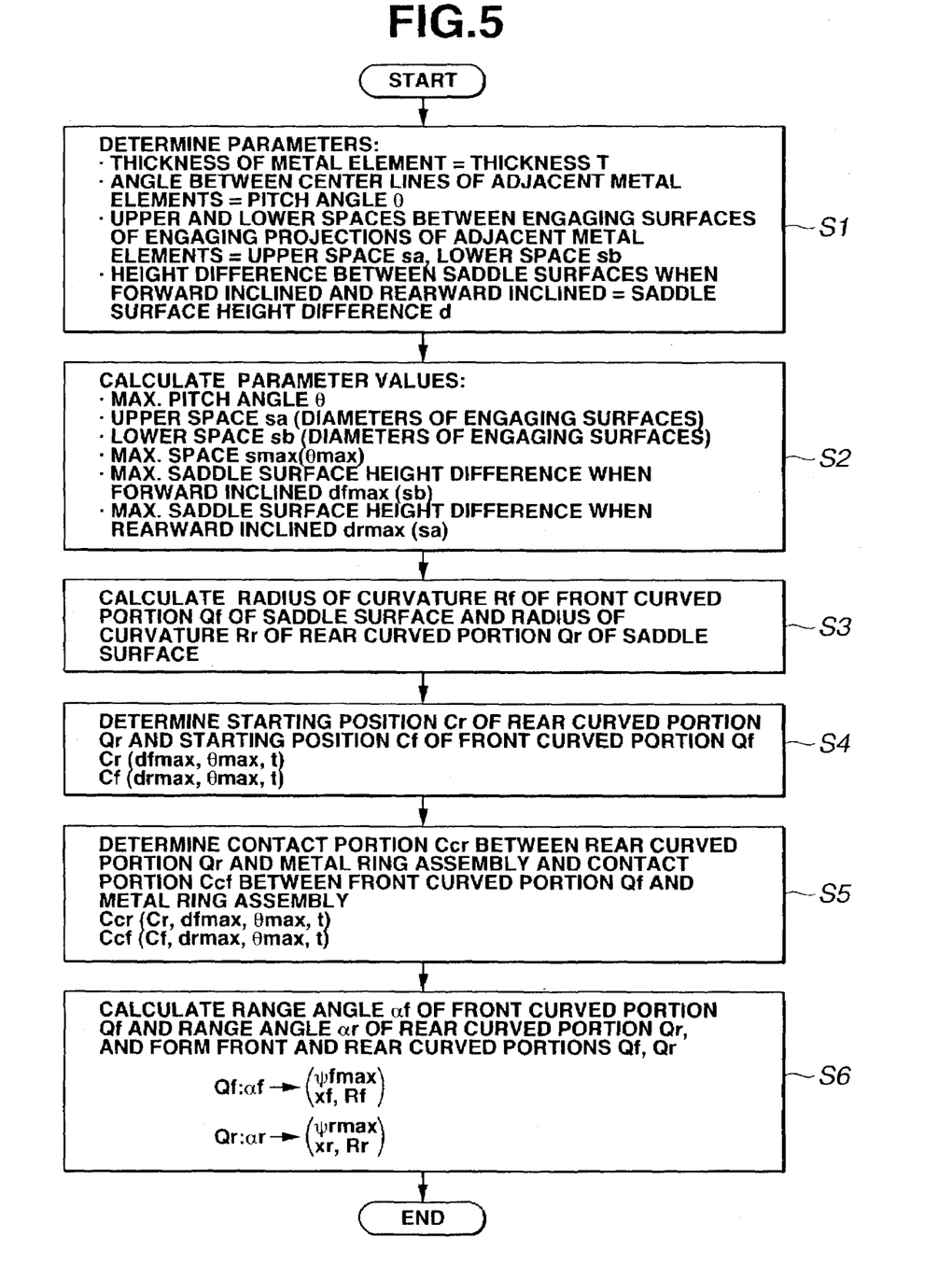
FIG. 5 is a flowchart illustrating a process of determination of the curved portion of FIGS. 3A, 3B, 4A and 4B.

Referring to FIGS. 2A–2C, 3A, 4A and 5, a method of forming curved portion Q of metal element 100 of the present invention is explained. FIG. 5 is a flowchart showing the formation of curved portion Q. In FIG. 5, at block S1, parameters t, θ, s, d are determined as follows.

- t: thickness of metal element
- θ: pitch angle between centerlines of adjacent metal elements 1 as shown in FIGS. 2A–2C
- s: space between an outer circumferential surface of projecting portion 8A of engaging projection 8 and an inner circumferential surface of recessed portion 8B thereof; sa: upper space, sb: lower space, as shown in FIG. 2A
- d: difference in height between saddle surfaces 5A of adjacent metal elements 1; dfmax: d at forward inclined state of adjacent metal elements 1 as shown in FIG. 2B, drmax: d at rearward inclined state of adjacent metal elements 1 as shown in FIG. 2C At block S2, values of parameters t, θ, s (sa, sb), and d (dfmax, drmax) are calculated. As illustrated in FIGS. 2A–2C, when lower end portions of adjacent metal elements 1 are contacted with each other or a slant front surface of body 2 of the rear metal element 1 is contacted with a rear surface of body 2 of the front metal element 1, pitch angle θ becomes maximum pitch angle θmax. FIG. 2A shows a neutral state of adjacent metal elements 1, in which upper space sa and lower space sb are generated, and there occurs no difference in height between saddle surfaces 5A of adjacent metal elements 1. In this state, space s becomes maximum space smax. FIG. 2B shows a forward inclined state of adjacent metal elements 1. In this state, a lower side of recessed portion 8B of front metal element 1 is contacted with a lower side of projecting portion 8A of rear metal element 1. Saddle surface 5A of front metal element 1 is located higher than saddle surface 5A of rear metal element 1. Difference in height d between saddle surfaces 5A of front and rear metal elements 1 becomes maximum height difference dfmax which is equal to lower space sb. FIG. 2C shows a rearward inclined state of adjacent metal elements 1. In this state, an upper side of projecting portion 8A of rear metal element 1 is contacted with an upper side of recessed portion 8B of front metal element 1. Saddle surface 5A of rear metal element 1 is located higher than saddle surface 5A of front metal element 1. Difference in height d between saddle surfaces 5A of rear and front metal elements 1 becomes maximum height difference drmax which is equal to upper space sa.

FIG. 3A shows the forward inclined state of metal elements 100, in which the inner circumferential surface of metal ring assembly 110 is contacted with a rear end periphery of saddle surface 105A of each of front and rear metal elements 100. On the other hand, FIG. 4A shows the rearward inclined state, in which the inner circumferential surface of metal ring assembly 110 is contacted with a front end periphery of saddle surface 105A of each of front and rear metal elements 1. Therefore, curved portion Q is formed on each of the rear and front end peripheries of saddle surface 105A by beveling. Reference characters Qr and Qf denote rear and front curved portions formed on the rear and front end peripheries of saddle surface 105A, respectively. Here, radius of curvature Rr of rear curved portion Qr and radius of curvature Rf of front curved portion Qf are set larger than range lengths xr and xf of rear and front curved portions Qr and Qf, respectively. Rear and front curved portions Qr and Qf are determined by the following processing at blocks S3–S6 of the flowchart of FIG. 5.

At block S3, radius of curvature Rf of front curved portion Qf and radius of curvature Rr of rear curved portion Qr are calculated so as to limit contact stress caused due to contact between the front and rear end peripheries of saddle surface 105A and the inner circumferential surface of metal ring assembly 110 to an allowable value or less. It is not necessary to extend front and rear curved portions Qf and Qr beyond a range in which the contact between the front and rear end peripheries of saddle surface 105A and the inner circumferential surface of metal ring assembly 110 occurs. Front and rear curved portions Qf and Qr can be formed so as to extend only over the range.

Next, at block S4, starting position C of curved portion Q is determined. Starting position C is indicated as the boundary point between curved portion Q and major portion 105B of saddle surface 105A as viewed in section. Concretely, starting position Cr of rear curved portion Qr and starting position Cf of front curved portion Qf are determined. Starting position Cr of rear curved portion Qr is determined such that the inner circumferential surface of metal ring assembly 110 is contacted with rear curved portion Qr even when difference in height d between saddle surfaces 105A at the forward inclined state of adjacent metal elements 100 is maximum height difference dfmax. If a distance between rear surface 100R and starting position Cr, namely, range length xr of rear curved portion Qr, is set larger, a clearance between rear curved portion Qr and the inner circumferential surface of metal ring assembly 110 will increase. This causes difficulty in formation or machining of rear curved portion Qr. If range length xr of rear curved portion Qr is set smaller, the clearance between rear curved portion Qr and the inner circumferential surface of metal ring assembly 110 will decrease so that the formation or machining of rear curved portion Qr can be facilitated. Therefore, preferably, range length xr of rear curved portion Qr is set smaller within a range in which the clearance between rear curved portion Qr and the inner circumferential surface of metal ring assembly 110 is generated. Starting position Cf of front curved portion Qf is determined such that the inner circumferential surface of metal ring assembly 110 is contacted with front curved portion Qf even when difference in height d between saddle surfaces 105A at the rearward inclined state of adjacent metal elements 100 is maximum height difference drmax. Preferably, range length xf of front curved portion Qf is set smaller within a range in which a clearance between front curved portion Qf and the inner circumferential surface of metal ring assembly 110 is generated.

Figure 3B:
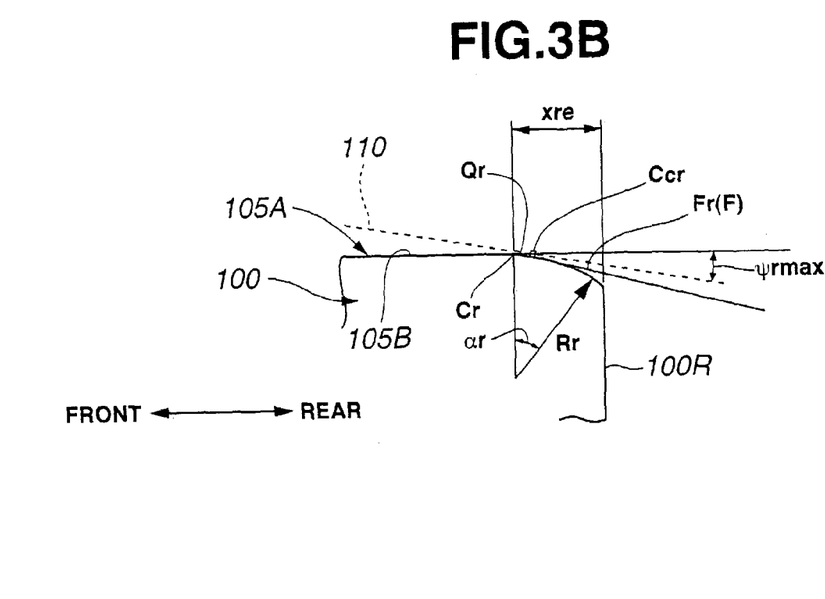
Figure 4B:
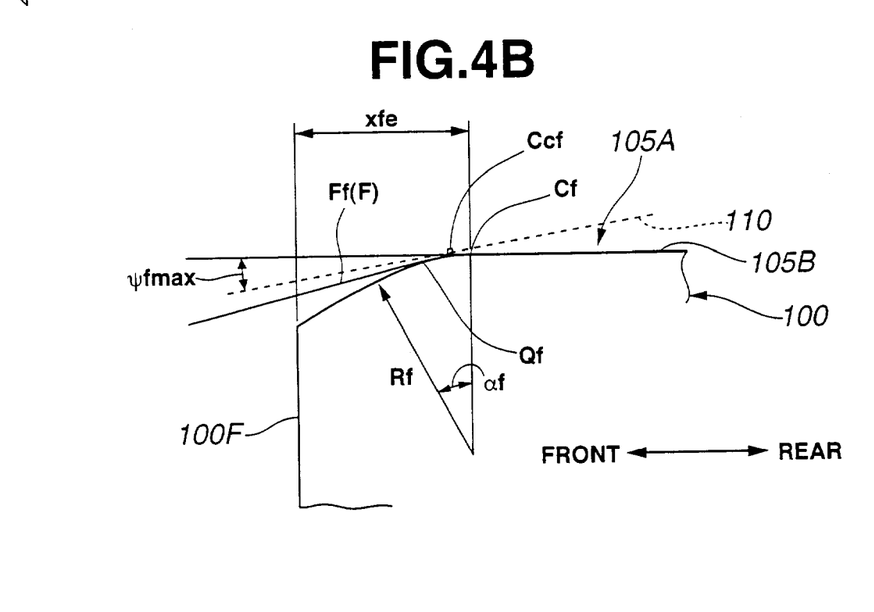

At block S5, contact portion Ccr between rear curved portion Qr and the inner circumferential surface of metal ring assembly 110 is determined by drawing tangent to rear curved portion Qr when difference in height d between saddle surfaces 105A at the forward inclined state of adjacent metal elements 100 is maximum height difference dfmax. Contact portion Ccr is shown in FIG. 3B. Further, contact portion Ccf between front curved portion Qf and the inner circumferential surface of metal ring assembly 110 is determined by drawing tangent to front curved portion Qf when difference in height d between saddle surfaces 105A at the rearward inclined state of adjacent metal elements 100 is maximum height difference drmax. Contact portion Ccf is shown in FIGS. 1 and 4B.

At block S6, range angle a of curved portion Q is determined, and curved portion Q is formed based on range angle α calculated. Namely, curved portion Q is formed so as to satisfy the following expression:

$$\sin \psi\text{max} < x/R < 1 \tag{4}$$

wherein ψmax represents maximum angle between major portion 105B of saddle surface 105A and the inner circumferential surface of metal ring assembly 110, x represents range length of curved portion Q, and R represents radius of curvature of curved portion Q.

Specifically, range angle αf of front curved portion Qf as shown in FIG. 1, is obtained from the following expressions:

$$\sin \psi\text{max} < xf/Rf < 1 \tag{5}$$

$$\sin \alpha f = xf/Rf \tag{6}$$

$$\alpha f = \sin^{-1}(xf/Rf) \tag{7}$$

wherein ψfmax represents maximum angle between major portion 105B of saddle surface 105A and the inner circumferential surface of metal ring assembly 110 at the rearward inclined state, xf represents range length of front curved portion Qf, and Rf represents radius of curvature of front curved portion Qf. The expressions (5)–(7) are given similar to the expressions (1)–(3). As illustrated in FIG. 1, front curved portion Qf and major portion 105B cooperate to form continuously extending saddle surface 105A. Center of curvature C0 of front curved portion Qf is located on line L1 which extends perpendicular to saddle surface 105A and passes through boundary point C1 (starting position Cf) between front curved portion Qf and major portion 105B. Namely, line L1 is a normal to front curved portion Qf at point C1. C2 indicates a front boundary point between front curved portion Qf and front surface 100F of metal element 100. Front boundary point C2 lies on a front ridge at which front curved portion Qf and front surface 100F encounter with each other. The front ridge extends between the side surfaces of metal element 100 opposed in the lateral direction of metal element 100. Line L2 passes through front boundary point C2 and perpendicularly intersects line L1 at point C3. A right-angled triangle is formed by three lines L1, L2 and Rf which join center of curvature C0, boundary point C2 and intersection point C3. A distance between points C2 and C3 is equivalent to range length xf of front curved portion Qf.

If front boundary point C2 is located at point Ccf of contact between front curved portion Qf and the inner circumferential surface of metal ring assembly 110 under condition that maximum angle ψfmax between major portion 105B of saddle surface 105A and the inner circumferential surface of metal ring assembly 110 is made, the right-angled triangle is indicated by phantom line in FIG. 1. In this case, range angle α0 of front curved portion Qf is equivalent to maximum angle ψfmax. Accordingly, the inner circumferential surface of metal ring assembly 110 is contacted with saddle surface 105A at front boundary point C2, namely, the front ridge at which front surface 100F encounters front curved portion Qf, so that there occurs stress concentration at the mutually contacting portion between the inner circumferential surface of metal ring assembly 110 and the front ridge between front surface 100F and front curved portion Qf.

In metal element 100 of the invention, ψfmax<sin$^{-1}$(xf/Rf) is transformed from sin ψfmax<xf/Rf in the expression (5). The following expression is derived from the expression (7) and the transformed expression.

$$\psi\text{fmax} < \alpha f \tag{8}$$

Therefore, if range angle αf of front curved portion Qf is larger than maximum angle ψfmax, the inner circumferential surface of metal ring assembly 110 can be in contact with saddle surface 105A in the range of front curved portion Qf, namely, is prevented from coming into contact with the front ridge between front surface 100F and front curved portion Qf. As a result, even when the angle between major portion 105B and the inner circumferential surface of metal ring assembly 110 is maximum angle ψfmax, a clearance between the front ridge and the inner circumferential surface of metal ring assembly 110 can be ensured. Further, if xf/Rf<1, i.e., xf<Rf, in the expression (5) is satisfied, radius of curvature Rf of front curved portion Qf will be a required minimum value.

Similarly, range angle αr of rear curved portion Qr is obtained from the following expressions:

$$\sin \psi r\max < xr/Rr < 1 \quad (9)$$

$$\sin \alpha r = xr/Rr \quad (10)$$

$$\alpha r = \sin^{-1}(xr/Rr) \quad (11)$$

wherein ψrmax represents maximum angle between major portion 105B of saddle surface 105A and the inner circumferential surface of metal ring assembly 110 at the forward inclined state, xr represents range length of rear curved portion Qr, and Rr represents radius of curvature of rear curved portion Qr. Further, the following expression is satisfied in rear curved portion Qr:

$$\psi r\max < \alpha r \quad (12)$$

Accordingly, the inner circumferential surface of metal ring assembly 110 can be in contact with saddle surface 105A in the range of rear curved portion Qr, namely, is prevented from coming into contact with a rear ridge between rear surface 100R and rear curved portion Qr as shown in FIG. 3A, even when the angle between major portion 105B and the inner circumferential surface of metal ring assembly 110 at the forward inclined state is maximum. Further, if xr/Rr<1, i.e., xr<Rr, in the expression (9) is satisfied, radius of curvature Rr of rear curved portion Qr will be a required minimum value.

Referring to FIGS. 3B and 4B, a modification of the metal element of the present invention is explained. In the modification, flat extension F of saddle surface 105A may be provided if curved portion Q has a range length larger than range length x. This is because curved portion Q is not necessitated to extend beyond range angle α. As illustrated in FIG. 3B, rear curved portion Qr extends over range length xre beyond range angle αr. Flat rear-extension Fr may be continuously connected with rear curved portion Qr and extend up to rear surface 100R of metal element 100. As illustrated in FIG. 4B, front curved portion Qf extends over range length xfe beyond range angle αf. Flat front-extension Ff may be continuously connected with front curved portion Qf and extend up to front surface 100F of metal element 100. An angle between flat extension F (Fr, Ff) and the inner circumferential surface of metal ring assembly 110 becomes larger than maximum angle ψmax between major portion 105B of saddle surface 105A and the inner circumferential surface of metal ring assembly 110. Flat extension F (Fr, Ff), therefore, can be free from contact with the inner circumferential surface of metal ring assembly 110. Preferably, flat extension F (Fr, Ff) is formed before forming curved portion Q (Qr, Qf).

As be appreciated from the above discussion, even if adjacent metal elements are inclined forward or rearward in the traveling direction of the CVT belt of the present invention, the inner circumferential surface of the metal ring assembly can be prevented from coming into contact with the front and rear ridges between the front and rear surfaces of the metal element and the front and rear curved portions of the saddle surface. This suppresses occurrence of stress concentration at the ridge, serving for enhancing life of the CVT belt.

Further, the front and rear curved portions of the saddle surface of the metal element of the CVT belt of the present invention can be so formed as to have a minimum range angle. This can reduce an amount of material to be removed upon forming the curved portions, serving for saving the beveling time and the production cost.

Further, with provision of the flat extension continuously connected with the curved portion, the machining operation can be readily performed before forming the curved portion. This serves for further reducing the amount of material to be removed and further saving the beveling time and the production cost.

This application is based on a prior Japanese Patent Application No. 2002-049849 filed on Feb. 26, 2002, the entire content of which is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. The continuously variable transmission belt comprising:
    a metal ring assembly including a plurality of metal rings;
    a plurality of metal elements retained by the metal ring assembly;
    wherein each of the metal elements have a saddle surface which is contacted with an inner circumferential surface of the metal ring assembly, each of the metal elements also having front and rear surfaces opposed to each other in a traveling direction of the belt, the saddle surface including a flat major portion and curved portions disposed at front and rear end peripheries of the saddle surface spaced from each other in the traveling direction of the belt, the curved portions cooperating at respective first ends with the flat major portion to form the saddle surface continuously extending in the traveling direction of the belt without forming a ridge therebetween, the curved portions each having a range length extending in the traveling direction of the belt and a radius of curvature larger than the range length, such that front and rear ridges are formed between the curved portions and the front and rear surfaces, respectively,
    wherein, under condition that the adjacent metal elements are inclined in the traveling direction of the belt so as to have a maximum pitch angle between centerlines thereof and that a maximum height difference between the saddle surfaces is generated, a relationship between a maximum angle between the saddle surface and the inner circumferential surface of the metal ring assembly, the range length of the curved portion, and the radius of curvature of the curved portion is satisfied by the following expression:

$$\sin \psi\max < x/R < 1$$

wherein ψmax represents the maximum angle between the saddle surface and the inner circumferential surface of the metal ring assembly, x represents the range length of the curved portion, and R represents the radius of curvature of the curved portion.

2. The continuously variable transmission belt as claimed in claim 1, wherein the saddle surface comprises a flat extension continuously connected with the curved portion, the flat extension extending between the curved portion and each of the front and rear ridges.

3. The continuously variable transmission belt as claimed in claim 1, wherein the curved portion has a range angle larger than the maximum angle $\psi$max, the range angle being an angle at a center subtended by an arc of the curved portion.

4. The continuously variable transmission belt as claimed in claim 1, wherein the maximum angle $\psi$max is formed between the flat major portion of the saddle surface and the inner circumferential surface of the metal ring assembly.

* * * * *